July 23, 1968    F. R. FERTIK ET AL    3,393,770
AUTOMATIC RECYCLING OILER
Filed Jan. 4, 1965    3 Sheets-Sheet 1
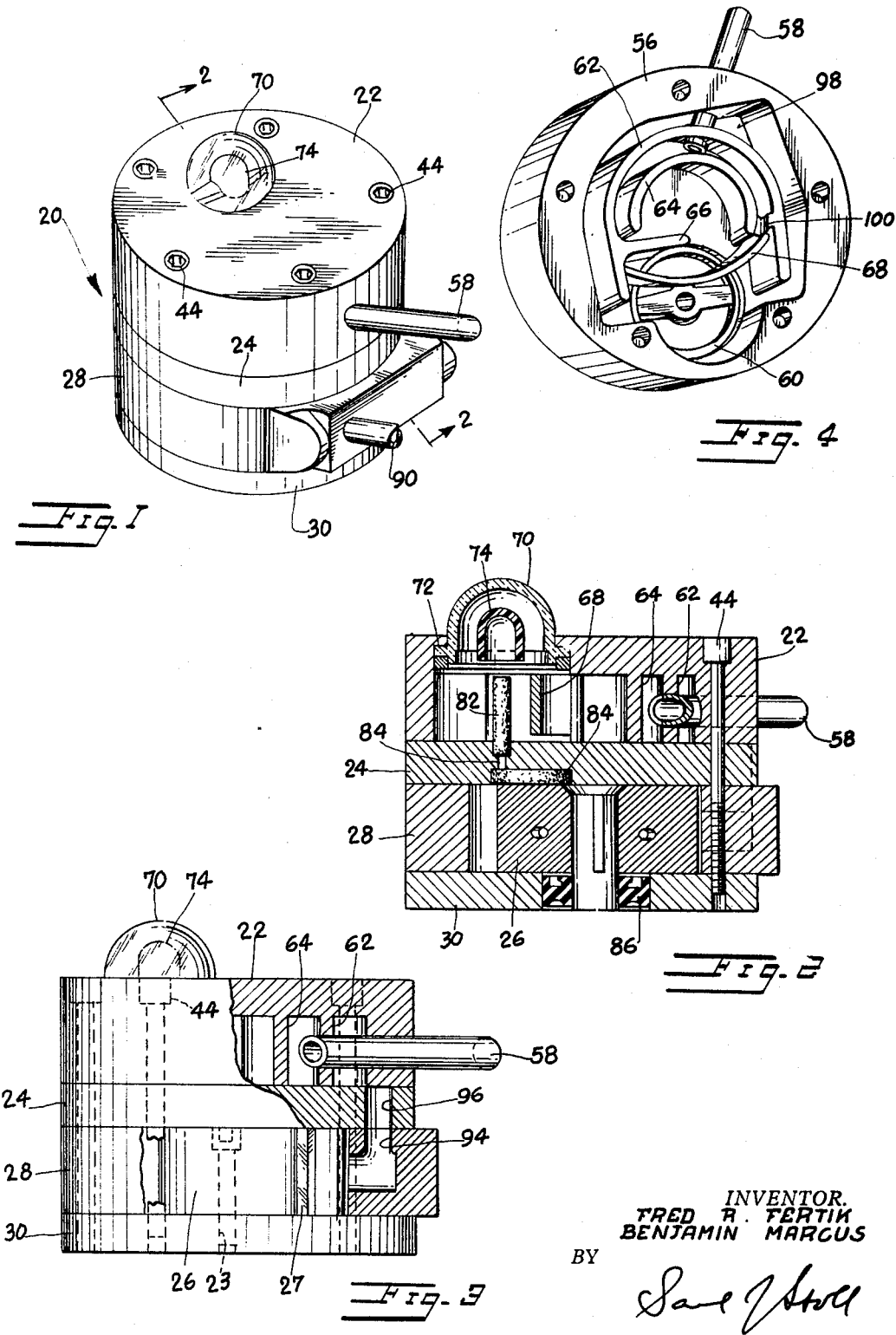
INVENTOR.
FRED R. FERTIK
BENJAMIN MARCUS
BY
ATTORNEY

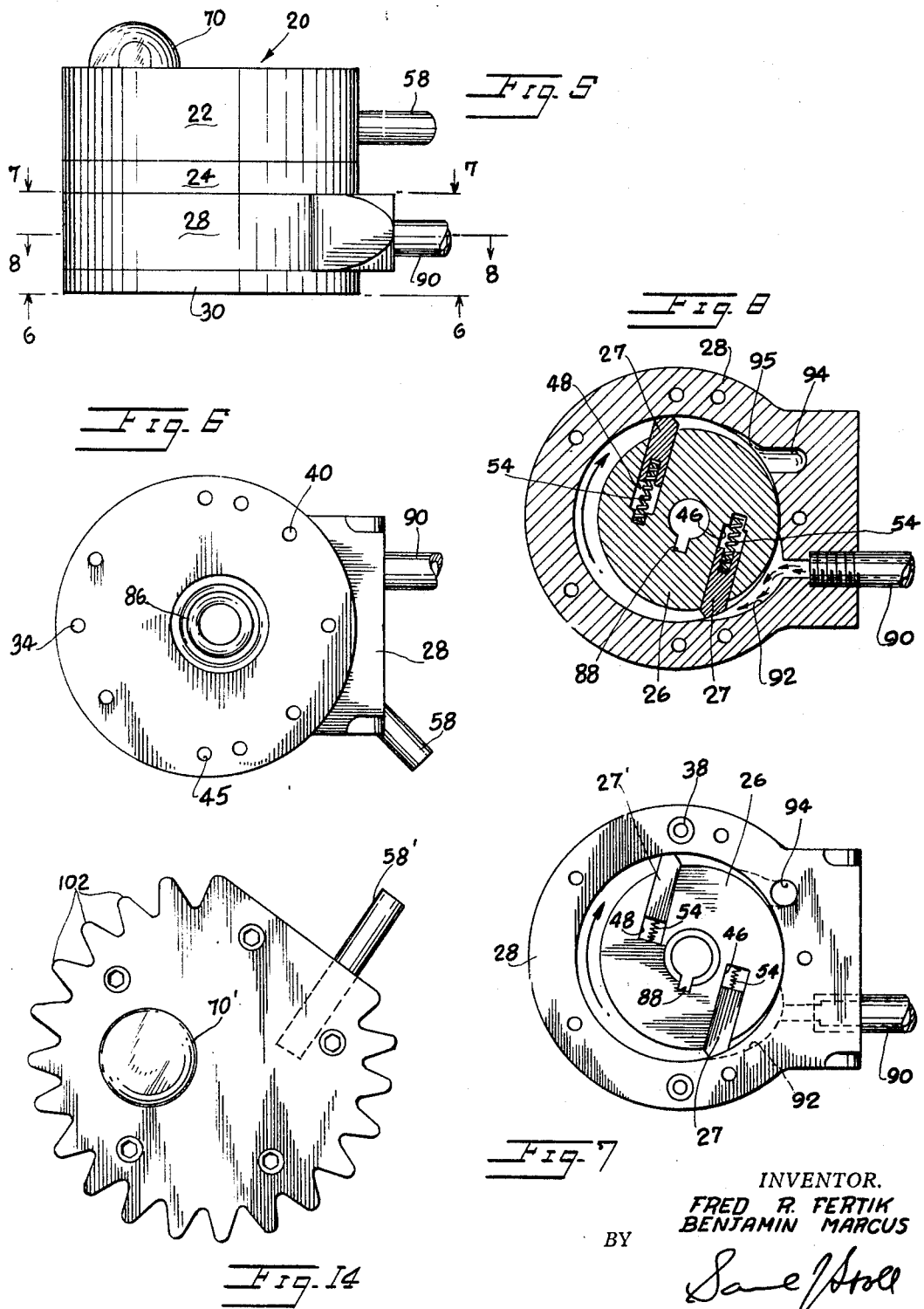

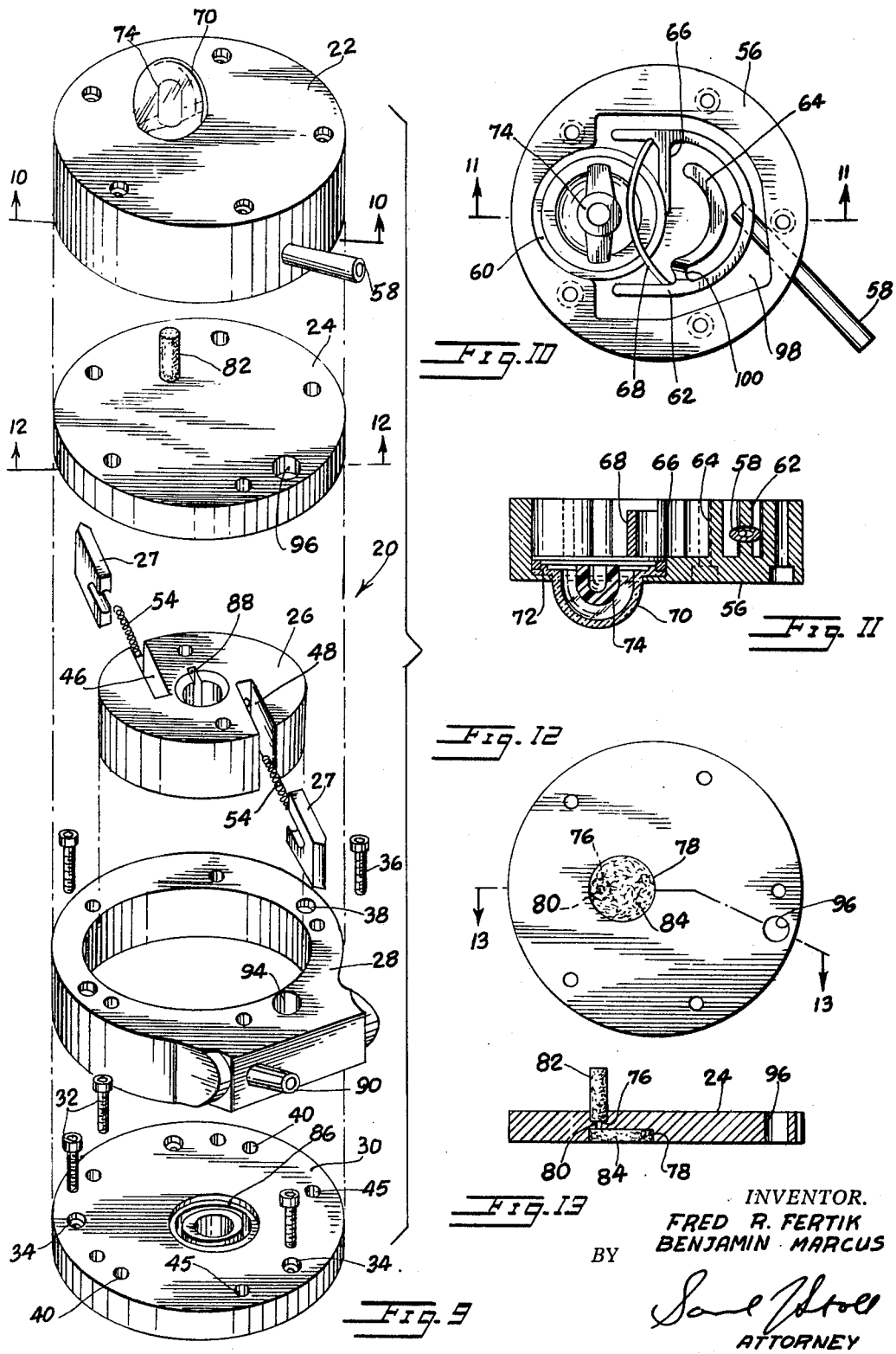

United States Patent Office 3,393,770
Patented July 23, 1968

3,393,770
AUTOMATIC RECYCLING OILER
Fred R. Fertik, Old Bethpage, and Benjamin Marcus, Whitestone, N.Y., assignors to C. M. Sorensen Co., Inc., Astoria, N.Y.
Filed Jan. 4, 1965, Ser. No. 423,023
1 Claim. (Cl. 184—6)

ABSTRACT OF THE DISCLOSURE

A recycling oiler having arcuate baffles to divert the outlet flow of air and therefore limit the quantity of oil otherwise expelled therewith, the oil being metered by a plural wick system, there being a return to the oiler from the pump to be oiled such that oil flows properly regardless of whether the pump is idling or is being operated as a vacuum pump or a pressure pump.

---

The present invention relates to an automatic recycling oiler for use with air pumps and more particularly to a recycling oiler for use with rotary type air pumps.

Present day air pumps, especially those used in the medical and dental fields, are capable of operating for approximately six to eight hours, after which time the oil supply must be replenished, since in the operation thereof the oil is expelled into the atmosphere.

It is the primary object of the present invention to provide an automatic recycling oiler which permits an air pump to be continuously operable for a long period of time without requiring the replenishment of the oil supply therein, and more particularly an automatic recycling oiler which will permit operation of an air pump for a period of 250 to 500 hours, or more, before requiring replenishment of the oil supply of said pump.

It is another object of the present invention to provide an air pump having an automatic recycling oiler assembly which will supply the correct amount of oil for the operation thereof for all operating conditions of said pump.

It is another object of the present invention to provide a rotary type air pump having an automatic recycling oiler which will permit the pump to operate continuously for a period of time in excess of 250 hours without necessitating the replenishment of the oil supply thereof.

It is a further object of the present invention to provide an air pump for use in present day medical applications wherein it is required to continuously supply a source of suction or pressure for extended periods of time.

It is another object of the present invention to provide an automatic recycling oiler for use with air pumps which is compact in size, easily secured to said pump, and which is relatively easy and inexpensive to manufacture.

Basically, and not by way of limitation, the present invention provides an automatic recycling oiler having a plurality of arcuate baffles to divert and direct the air flow so as to remove, and therefore recycle, oil carried therein. The flow of oil is metered by a plurality of wicks, preferably two, the first of which extends from the oil reservoir and the last of which extends to the part to be lubricated, an orifice to limit and control the oil flow being located between the wicks which are accordingly in spaced relation.

These and other objects, features and advantages of the present invention will become more apparent when considered in conjunction with the accompanying drawings wherein:

FIGURE 1 is a perspective view of the automatic recycling oiler and pump assembly of the present invention.

FIGURE 2 is a sectional view taken on the line 2—2 of FIGURE 1.

FIGURE 3 is a partial sectional view of the pump and oiler depicted in FIGURE 1.

FIGURE 4 is a perspective view of the automatic recycling oiler of the present invention.

FIGURE 5 is a front view of the automatic recycling oiler and pump assembly shown in FIGURE 1.

FIGURE 6 is a bottom view taken on the line 6—6 of FIGURE 5.

FIGURE 7 is a sectional view taken on the line 7—7 of FIGURE 5.

FIGURE 8 is a view taken on the line 8—8 of FIGURE 5.

FIGURE 9 is a disassembled exploded view of the automatic recycling oiler and pump assembly shown in FIGURE 1.

FIGURE 10 is an interior view of the automatic recycling oiler taken on the line 10—10 of FIGURE 9.

FIGURE 11 is a sectional view taken on the line 11—11 of FIGURE 10.

FIGURE 12 is a view taken on the line 12—12 of FIGURE 9.

FIGURE 13 is a sectional view taken on the line 13—13 of FIGURE 12.

FIGURE 14 is a top view of another embodiment of the automatic recycling oiler of the present invention.

Referring now to the drawings, and more particularly to FIGURES 1 and 9, there is shown an automatic recycling oiler and pump assembly 20, comprising an automatic recycling oiler 22, a front plate 24, a rotor 26, vanes 27, a ring casting 28 and a rear plate 30.

The oiler and pump assembly 20 are secured to a motor (not shown) by means of screws 32 which are placed in recessed holes 34 of the rear plate 30, and the ring casting 28 is secured to said rear plate by means of screws 36 which are placed in holes 38 in said ring casting; said screws being engaged by the threaded bores 40 in the rear plate 30.

The rotor 26 is positioned within the ring casting 28 and the front plate 24 is placed in abutting relationship thereon. The oiler 22 is then placed in abutting relationship with said front plate and the entire assembly 20 is secured by means of screws 44 which engage the threaded bores 45 in the rear plate 30 (as shown in FIGURE 1).

The rotor 26 which is placed within the casting 28 has two slots 46 and 48 formed therein into which are inserted the vanes 27, said vanes being biased against the inner surface of the casting 28 by means of coil springs 54.

The recycling oiler 22, as best seen in FIGURES 4 and 10, includes a housing or casing 56 and a tube 58 which serves as the outlet port or pressure outlet of the pump. The casing 56 has a recessed portion 60 at the bottom thereof which serves as the oil reservoir, and a plurality of members 62, 64 and 66 having arcuate portions serve as baffles to divert the flow of air to the outlet port in order to limit the amount of oil which is expelled out of said pump into the atmosphere; the manner of which will be explained in more detail hereinafter. A curved member 68 which extends between the legs of the U-shaped baffle 62 above the reservoir 60, serves as a splash shield to prevent the oil in said reservoir from travelling upwardly toward the outlet port 58.

A transparent dome assembly 70, made of plastic or any other suitable material, such as glass, is inserted into a recess 72 in the casing 56 and a smaller dome 74, preferably white in color, is secured within the dome assembly 70; the domes 70 and 74 serving to permit the viewing of the quantity of oil in the reservoir 60 externally of said oiler 22. The front edges of the baffles 62, 64 and 66 and the inner face of the casing 56 are coplanar, and abut the front plate 24, while the front edge of the splash shield 68 is slightly recessed with respect to said front edges of said baffles. It will also be noted that the inlet end of the outlet port 58 is force fitted into an opening in the arcuate portion of the U-shaped baffle 62 and is positioned in the space intermediate the baffle 62 and the baffle 64.

The front plate 24 has a circular recess 76 formed in the front face thereof and a circular recess 78 formed in the rear face thereof; said recess being interconnected by means of a small opening 80 which serves as a metering hole to regulate the amount of oil supplied to said pump. A wick 82, preferably made of felt, has one end thereof inserted into the recess 76, while the other end thereof projects into the oil contained in the reservoir 60. Another wick 84, which is also preferably made of felt, is inserted into the recess 78 and abuts the rotor 26 when the pump is in its assembled position.

In the operation of the present invention the keyed shaft of a motor (not shown) is inserted through the seal 86 in the rear plate and engages the rotor 26 by means of the keyed opening 88 therein. When the pump is in its neutral or off position a small amount of oil is supplied to said pump by the flow of oil from the reservoir 60 through the wick 82, the metering hole 80 and the wick 84 by capillary action. When the pump is in its on or idling position the rotational movement of the rotor 26 causes a slight decrease in pressure in the pump, thereby causing a slight pressure differential between the pump and the oiler which causes a greater amount of oil to flow through the wick 82, metering hole 80, wick 84 and thence to said rotor, and then flows in the neutral or off position of said pump. When the pump is actively operated, i.e., when it is operated as either a vacuum source or a pressure source, a greater pressure differential exists between the oiler and the pump in that the pressurized air is present in the oiler assembly. This causes a greater flow of oil from the oiler to said pump and insures satisfactory operation of said pump.

The pump is provided with an inlet port 90 located in the top of the ring casting 28 and the inner portion of said casting has a recess portion 92 located adjacent said inlet port 90 and in flow communication therewith, said recessed portion serving to regulate the amount of the air flow into said pump. It will be noted that the rotor is eccentrically positioned within the ring casting 28, so that the air flowing into said pump is compressed by the vane 27 during the rotational movement of the rotor 26, so that the air presented at the outlet of the ring casting 94 is pressurized; the recess 95 adjacent said outlet 94 and in flow communication therewith serving to regulate the flow of air to said outlet port. The air flowing through the port 94 is admixed with oil and flows through an opening 96 in the front plate 24 to a recessed portion 98 in the oiler assembly 22. The oil and air admixture then impinges upon the outer portion of the U-shaped baffle 62, and flows downwardly thereon, causing a portion of the oil in said admixture to flow into said reservoir 60. The admixture then flows upwardly and a portion thereof impinges upon the splash shield 68, causing more of the oil in the admixture to return to the reservoir 60, while the remainder of the admixture flows past said splash shield around the front and rear edges thereof, the admixture then impinges upon the baffles 66 and 68, which diverts the flow thereof and causing more oil to flow downwardly into said reservoir 60. The remaining admixture then flows around the outer surface of the baffle 64 to the inlet end of the outlet port 58 and any remaining oil which has not been expelled to the atmosphere then flows downwardly along the outer surface of the baffle 64, and a recess or niche 100 positioned intermediate the baffle 62 and 64 permits the oil to flow downwardly and return to the reservoir 60.

It should be noted that in the preferred embodiment of the invention the baffles 62, 64 and 66 are formed integrally with the casing 56 and the splash shield 68 is inserted into the oiler assembly 22 after the formation thereof.

Another embodiment of the automatic recycling oiler of the present invention is shown in FIGURE 14, wherein like parts are designated by like reference numerals.

The oiler 22' is formed having a plurality of vanes 102 around the periphery thereof, said vanes serving to radiate the heat within said oiler outwardly therefrom, thereby reducing vaporization of the oil supply within said oiler.

While the pump has been described as having a rear plate 30, this is required only when the motor casing is made of aluminum. If the motor mounting is made of cast iron as is the ring casting 28, then the necessity for a rear plate 30 is obviated and the pump is secured to the motor by having the ring casting abut the motor casing.

It is thus seen that I have provided a new and useful automatic recycling oiler for use with pumps which serves to substantially decrease the amount of oil which is expelled into the atmosphere by the operation of the pump, thus enabling the pump to continuously operate for a long period of time without requiring the replenishment of the oil supply thereof.

What is claimed is:

1. An automatic recycling oiler adapted to be connected to an air pump, said oiler comprising a housing, and oil reservoir, a pressure outlet for said pump and inlet means for receiving an admixture of pressurized air and oil from said pump, said reservoir being positioned at the bottom of said housing and said pressure outlet being positioned at the top of said housing, and means positioned intermediate said reservoir and said pressure outlet for diverting the flow of said oil and air admixture whereby the oil in said admixture is separated therefrom and flows downwardly into said oil reservoir, permitting the oil to be recycled, said means for diverting the flow of said oil and air admixture comprising a plurality of baffles having arcuate portions and a splash shield, said baffles and said splash shield being in spaced relation, said plurality of baffles comprising a first baffle, a second baffle and a third baffle, said first baffle being substantially U-shaped and located within said housing in spaced relation therefrom thereby directing said admixture to flow toward said reservoir, said second baffle being located within said first baffle in spaced relation therefrom and substantially concentric with the arcuate portion thereof forming a channel therebetween and directing said admixture to flow therein away from said reservoir and said third baffle being interposed across said channel, a splash shield, said splash shield being arcuate and located above said reservoir spanning from end to end of said first and second baffles, the center of the arc extending toward said reservoir, a plurality of spaced wicks connecting between said reservoir and said pump whereby when said air pump is in its neutral position oil flows through said wicks by capillary action and when said air pump is operated as a pressure or vacuum source a pressure differential is created across said wicks to force oil from said reservoir at a higher pressure to said air pump at a lower pressure, one of said wicks being in radial contact with the rotor of said air pump.

References Cited

UNITED STATES PATENTS

| | | | |
|---|---|---|---|
| 1,038,265 | 9/1912 | Baker | 221—187 X |
| 2,153,349 | 4/1939 | Squiller | 184—6 X |
| 2,675,958 | 4/1954 | Deibel | 184—6 X |
| 2,689,080 | 9/1954 | Preiss | 184—6 X |
| 2,785,851 | 3/1957 | Menon | 230—207 X |
| 2,848,967 | 8/1958 | Nicolay | 184—6 X |

FOREIGN PATENTS

| | | |
|---|---|---|
| 116,014 | 10/1942 | Australia. |
| 1,016,076 | 9/1957 | Germany. |

LAVERNE D. GEIGER, *Primary Examiner.*

E. J. EARLS, *Assistant Examiner.*